United States Patent [19]

Besslein

[11] 4,347,814
[45] Sep. 7, 1982

[54] PRECHAMBER FOR AN AIR-COMPRESSING INJECTION INTERNAL COMBUSTION ENGINE

[75] Inventor: Wulf Besslein, Darmstadt, Fed. Rep. of Germany

[73] Assignee: Daimler-Benz Aktiengesellschaft, Stuttgart, Fed. Rep. of Germany

[21] Appl. No.: 911,313

[22] Filed: Jun. 1, 1978

[30] Foreign Application Priority Data

Jun. 4, 1977 [DE] Fed. Rep. of Germany ....... 2725344

[51] Int. Cl.³ ............................................ F02B 19/08
[52] U.S. Cl. .................................... 123/261; 123/263; 123/275
[58] Field of Search ............ 123/191 S, 191 SP, 32 C, 123/32 D, 32 SP, 32 ST, 251, 261, 262, 263, 275, 286

[56] References Cited

U.S. PATENT DOCUMENTS

| | | | |
|---|---|---|---|
| 2,735,413 | 2/1956 | Meyer et al. ..................... | 123/32 SP |
| 2,787,258 | 4/1957 | Schumann .......................... | 123/32 D |
| 3,814,067 | 6/1974 | Fuente .............................. | 123/32 SP |
| 3,987,765 | 10/1976 | Sato et al. ...................... | 123/191 SP |
| 4,046,111 | 9/1977 | Nagano .......................... | 123/191 SP |
| 4,123,998 | 11/1978 | Heintzelman .................... | 123/191 S |
| 4,218,992 | 8/1980 | Latsch et al. ..................... | 123/263 |

FOREIGN PATENT DOCUMENTS

| | | | |
|---|---|---|---|
| 1294092 | 4/1969 | Fed. Rep. of Germany .... | 123/32 C |
| 2537001 | 12/1976 | Fed. Rep. of Germany .... | 123/32 C |
| 75913 | 1/1931 | Sweden ........................... | 123/32 SP |

Primary Examiner—Craig R. Feinberg
Attorney, Agent, or Firm—Craig and Antonelli

[57] ABSTRACT

A prechamber for an air-compressing injection internal combustion engine which includes an enlarged space portion in communication with the cylinder space by way of a channel-shaped space portion; fuel is injected into the enlarged space portion essentially in the direction of the channel-shaped space portion while a baffle member is provided in the enlarged space portion which has a surface curved in the direction toward the fuel jet; the bottom side of the baffle member or of the insert pin thereof is constructed at least within the area of the baffle member as guide surface for the in-flowing combustion air flowing into the enlarged space portion of the prechamber.

14 Claims, 1 Drawing Figure

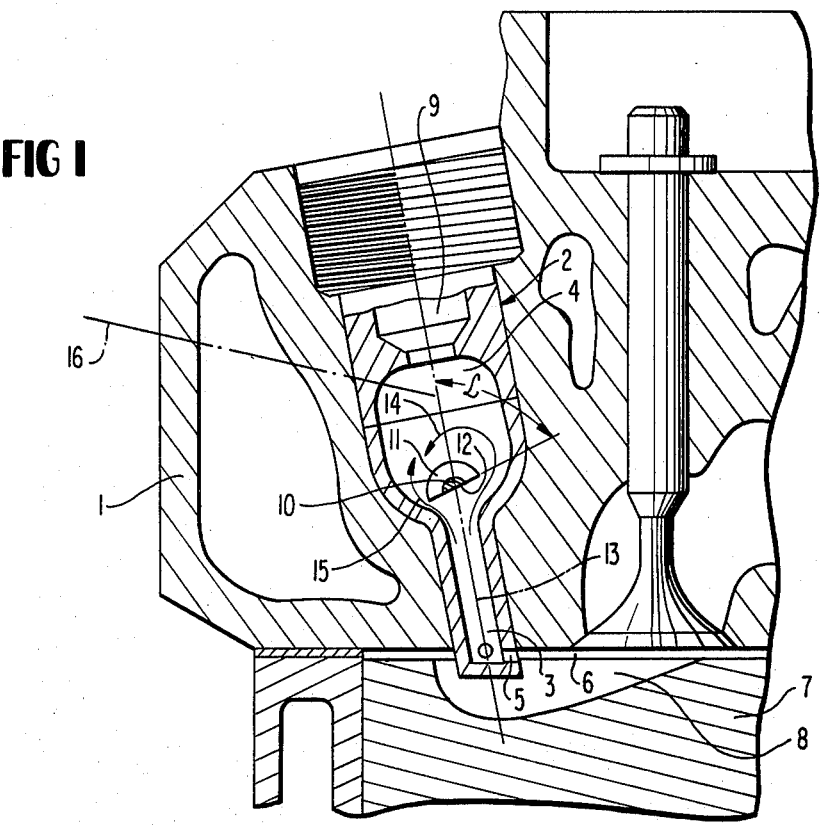
FIG 1
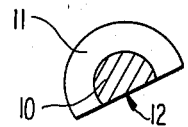 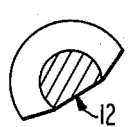 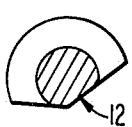 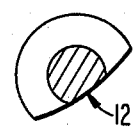 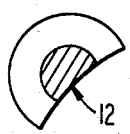
FIG 2  FIG 3  FIG 4  FIG 5  FIG 6
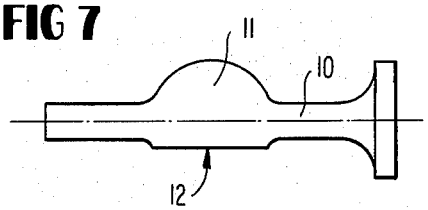 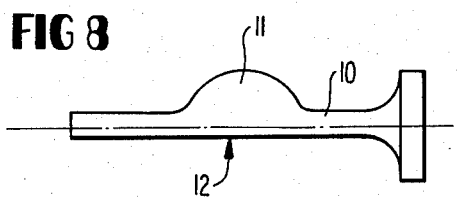
FIG 7  FIG 8
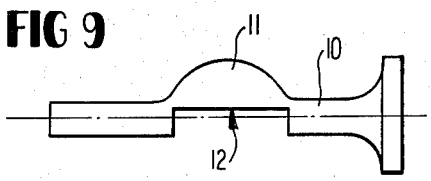 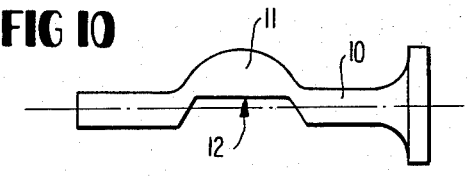
FIG 9  FIG 10

PRECHAMBER FOR AN AIR-COMPRESSING INJECTION INTERNAL COMBUSTION ENGINE

The present invention relates to a prechamber for an air-compressing injection internal combustion engine which is provided with an enlarged space portion in communication with the cylinder space by way of a channel-shaped space portion, into which fuel is injected from an injection nozzle essentially in the direction of the channel-shaped space portion and in which a baffle or deflection member provided with a surface curved toward the fuel jet is arranged on an insert pin supported at one or both sides thereof in the enlarged space portion respectively is formed by an insert pin.

The present invention is concerned with the task to improve the mixture formation in a prechamber of the described type in such a manner that a decrease of the blackening values is achieved with favorable fuel consumption values especially at partial load.

The underlying problems are solved according to the present invention in that the bottom side of the baffle or deflection member respectively of the insert pin is constructed within the area of the baffle or deflection member as guide surface for the in-flowing combustion air flowing into the enlarged space portion of the prechamber.

A guidance is created by the arrangement of a guide surface for the in-flowing combustion air flowing into the enlarged space portion of the prechamber during the compression stroke of the internal combustion engine through the channel-shaped space portion so that the combustion air circumcirculates in an orderly manner about the baffle or deflection member, and it becomes possible thereby to match the fuel jet discharged from the injection nozzle and directed onto the baffle or deflection member in its direction, in its intensity and as regards the fuel quantity to the combustion air stream. A favorable mixture preparation will establish itself and an avoidance of the soot formation will result. As a result of a reduction of the soot components at full load, a larger quantity of fuel can be utilized for the combustion for purposes of increasing the output, which is limited exclusively by the smoke limit. The prechamber exhibits a behavior similar to a vortex chamber, however, with the advantage of a considerably lesser noise development.

In an advantageous construction of the inventive concept, the guide surface may be arranged at an angle of less than 90° to the center longitudinal axis through the channel-shaped space portion. It is achieved in this manner that the in-flowing combustion air is subdivided into two partial streams, and more particularly, into a stronger partial stream and into a weaker partial stream which meet both above the baffle or deflection member and which enhance thereat a favorable mixture formation in conjunction with the fuel.

The guide surface may extend at the insert pin up to the walls of the prechamber so that the entire combustion air flowing into the prechamber is seized thereby.

The guide surface may be constructed as plane surface, however, it may also be formed by at least two plane surfaces butting at one another. Moreover, it is also possible to construct the guide surface concavely or convexly curved.

It is particularly advantageous if the guide surface, for purposes of bunching or concentrating the air streams may be constructed at the bottom side of the baffle or deflection member, respectively, of the insert pin within this area as bottom of a cut-in channel.

Accordingly, it is an object of the present invention to provide a prechamber for an air-compressing injection internal combustion engine which avoids by simple means the aforementioned shortcomings and drawbacks encountered in the prior art.

Another object of the present invention resides in a prechamber for an air-compressing injection internal combustion engine which effectively achieves a lowering of the blackening values with favorable fuel consumption, especially at partial loads.

A further object of the present invention resides in a prechamber for an air-compressing injection internal combustion engine which significantly improves the mixture formation.

Still a further object of the present invention resides in a prechamber for an air-compressing injection internal combustion engine which advantageously provides a guidance for the air flowing into the prechamber to enable an optimum matching of the fuel jet directed onto the deflection member in its direction, in its intensity and in its fuel quantity with respect to the combustion air stream.

Another object of the present invention resides in a prechamber of an air-compressing injection internal combustion engine which not only assures a favorable mixture formation but also a reduction of the soot formation.

A further object of the present invention resides in a prechamber for an air-compressing injection internal combustion engine which exhibits the advantages of a vortex chamber without its disadvantage of substantial noise development.

These and other objects, features and advantages of the present invention will become more apparent from the following description when taken in connection with the accompanying drawing which shows, for purposes of illustration only, several embodiments in accordance with the present invention, and wherein:

FIG. 1 is a cross-sectional view through a cylinder head with a prechamber in accordance with the present invention;

FIGS. 2 through 6 are cross-sectional views, on an enlarged scale, through various modified embodiments of a baffle or deflection member with insert pin having differently constructed guide surfaces in accordance with the present invention; and FIGS. 7 to 10 are elevational views, also on an enlarged scale, of baffle or deflection members with insert pin and having different guide surface arrangements in accordance with the present invention.

Referring now to the drawing wherein like reference numerals are used throughout the various views to designate like parts, according to FIG. 1 a prechamber generally designated by reference numeral 2 is arranged in the cylinder head 1 of an air-compressing injection internal combustion engine, which includes a channel-shaped space portion 3 and an enlarged space portion 4 coaxially adjoining the space portion 3. The channel-shaped space portion 3 of the prechamber 2 is in communication by way of bores 5 with the cylinder space 6, respectively, with combustion space recess 8 provided in the piston 7 of the internal combustion engine. An aperture 9 for the arrangement of an injection nozzle is disposed above the enlarged space portion 4.

A baffle or deflection member 11 is arranged in the enlarged space portion 4 on an insert pin 10 extending through this space portion 4, which is constructed essentially hemispherically shaped and which is directed with its curved surface against the fuel jet that is discharged from the injection nozzle (not shown). The bottom side of the baffle or deflection member 11 is constructed as guide surface 12 which extends at an angle α of less than 90° to the center longitudinal axis 13 through the channel-shaped space portion 3. The guide surface 12 at the baffle or deflection member 11 is extended on the insert pin 10 on both sides of the baffle member.

The combustion air displaced into the prechamber 2 through the channel-shaped space portion 3 during the compression stroke of the piston 7 is subdivided by the guide surface 12 inclined at the angle α into two defined streams, of which one stream moves about or circumcirculates the deflection member 11 along a greater arc in the direction of arrow 14 and the other stream along a smaller oppositely directed arc in the direction of arrow 15. The combustion air which sweeps past the baffle or deflection member 11 on two sides thereof, can be influenced with a change of the angle α as regards its respective quantity in the individual streams.

The fuel jet discharged from the injection nozzle can be directed against the baffle or deflection member 11 lying in the center longitudinal axis through the prechamber; however, the arrangement may also be made in such a manner that the fuel jet impinges on the baffle or deflection member 11 outside of the center longitudinal axis. A glow plug indicated by the center line 16 is appropriately arranged projecting into the upper area of the enlarged space portion 4.

FIG. 2 illustrates on an enlarged scale the baffle or deflection member 11 with insert pin 10 which can be seen from FIG. 1. The guide surface 12 on the bottom side of the baffle or deflection member 11 and of the insert pin 10 is constructed within this area as continuous plane or flat surface.

According to the embodiment of FIG. 3, the guide surface 3 consists of three flat surface portions butting at one another at an angle, whereas according to FIG. 4, it is formed of two flat surface portions disposed at an angle to one another.

According to FIG. 5, the guide surface 12 is slightly concavely curved and according to FIG. 6, is slightly convexly curved.

FIG. 7 illustrates that the guide surface 12 may be arranged alone under the baffle or deflection member 11. In contrast thereto, FIG. 8 illustrates a guide surface 12 which extends under the baffle or deflection member 11 and continues at the insert pin 10 on both sides thereof.

That the guide surface 12 may also be formed by the bottom of a cut-in channel arranged under the baffle or deflection member 11 is illustrated by FIGS. 9 and 10, whereby according to FIG. 9, the side walls of the cut-in channel are at right angle to the guide surface 12 and the side walls according to FIG. 10 extend at an inclination to the guide surface 12. Of course, the side walls may also be formed by curved surfaces. It is also possible within the scope of the present invention to construct the bottom of the cut-in channel not only corresponding to the guide surface of FIG. 2 but also corresponding to the guide surfaces 12 according to FIGS. 3 to 6.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A prechamber for an air-compressing injection internal combustion engine, the prechamber comprising an enlarged space portion in communication with a cylinder space by way of a channel-shaped space portion, fuel being injected into the enlarged space portion from an injection nozzle generally in a direction of the channel-shaped space portion, and baffle means with a curved surface facing a fuel jet and provided in said enlarged space portion, characterized in that a bottom side of the baffle means is constructed as a guide surface means for the combustion air flowing into the enlarged space portion of the prechamber, the baffle means is arranged at an insert pin supported in the enlarged space portion, the guide surface means continues on the insert pin up to walls of the prechamber, and in that the guide surface means is constructed within an area of the baffle means as a bottom of a cut-in channel means.

2. A prechamber according to claim 1, characterized in that side walls of the channel means are essentially at right angle to the bottom.

3. A prechamber according to claim 2, characterized in that side walls of the channel means are non-perpendicular to the bottom.

4. A prechamber according to claim 2, characterized in that side walls of the channel means are curved.

5. A prechamber for an air-compressing injection internal combustion engine, the prechamber comprising an enlarged space portion in communication with a cylinder space by way of a channel-shaped space portion, fuel being injected into the enlarged space portion from an injection nozzle generally in a direction of the channel-shaped space portion, and baffle means with a curved surface facing a fuel jet and provided in said enlarged space portion, characterized in that a bottom side of the baffle means is constructed as a guide surface means for the combustion air flowing into the enlarged space portion of the prechamber, and in that the guide surface means is constructed within an area of the baffle means as a bottom of a cut-in channel means.

6. A prechamber according to claim 5, characterized in that side walls of the channel means are essentially at right angle to the bottom.

7. A prechamber according to claim 5, characterized in that side walls of the channel means are non-perpendicular to the bottom.

8. A prechamber according to claim 5, characterized in that side walls of the channel means are curved.

9. A prechamber according to claim 5, characterized in that the baffle means is arranged at an insert pin supported in the enlarged space portion.

10. A prechamber according to claim 5, characterized in that the insert pin is supported on one side thereof in the enlarged space portion.

11. A prechamber according to claim 5, characterized in that the insert pin is supported on both sides thereof in the enlarged space portion.

12. A prechamber according to claim 5, characterized in that the baffle means is formed by the insert pin and in that the bottom side of the insert pin is constructed as a guide surface means at least within an area of the baffle means.

13. A prechamber according to one of claims 9, 10, 11, or 12, characterized in that the guide surface means is arranged so as to lie at an angle of less than 90° with respect to a center longitudinal axis extending through the channel-shaped space portion.

14. A prechamber according to claim 13, characterized in that the guide surface means continues on the insert pin up to walls of the prechamber.

* * * * *